UNITED STATES PATENT OFFICE.

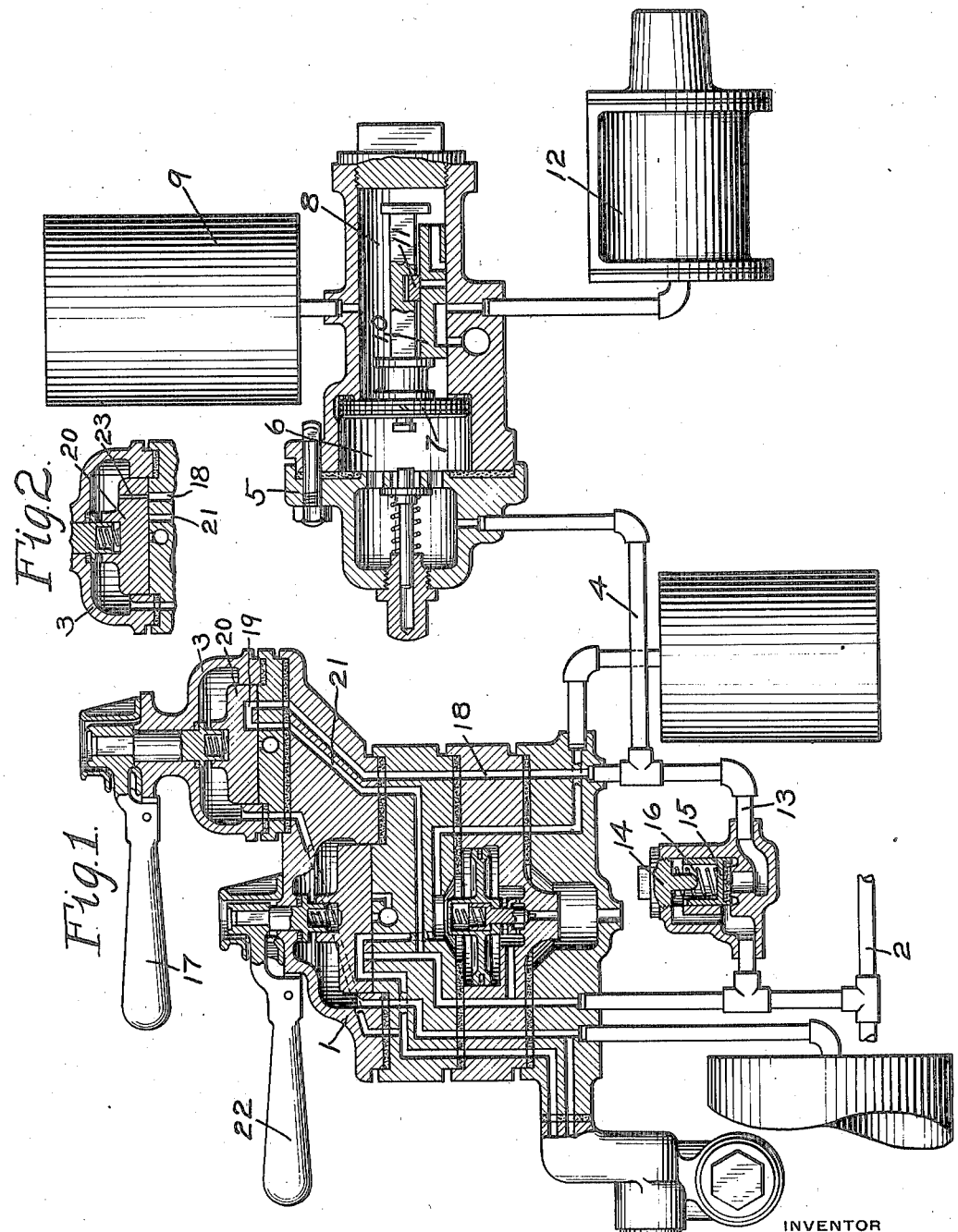

WALTER V. TURNER, OF WILKINSBURG, PENNSYLVANIA, ASSIGNOR TO THE WESTINGHOUSE AIR BRAKE COMPANY, OF WILMERDING, PENNSYLVANIA, A CORPORATION OF PENNSYLVANIA.

LOCOMOTIVE BRAKE DEVICE.

1,294,982.  Specification of Letters Patent.  Patented Feb. 18, 1919.

Application filed October 16, 1917. Serial No. 196,931.

*To all whom it may concern:*

Be it known that I, WALTER V. TURNER, a citizen of the United States, residing at Wilkinsburg, in the county of Allegheny and State of Pennsylvania, have invented new and useful Improvements in Locomotive Brake Devices, of which the following is a specification.

This invention relates to fluid pressure brakes, and more particularly to a locomotive brake equipment.

It has heretofore been proposed to provide a locomotive brake equipment having an independent brake valve in addition to the usual brake valve and an independent brake pipe connected to the brake controlling valve on the locomotive so that by manipulating the independent brake valve, the pressure in the independent brake pipe may be varied to control the brakes on the locomotive independently of those on the train.

In double end equipments, such as are employed on electric locomotives, the handle off position of the independent brake valve is so arranged as to cut off the independent brake pipe from the main brake pipe, so that the brakes can be controlled at the operating end by manipulation of the independent brake valve, which would be impossible if the non-operating brake valve were left in a position connecting the main brake pipe with the independent brake pipe.

A difficulty arises, however, in having the independent brake pipe cut off from the main brake pipe in the handle off position of the independent brake valve, in that the independent brake valve might accidentally be placed in handle-off position at the operative end of the locomotive. Under these conditions, it would be impossible to obtain an application of the brakes on the locomotive, where the automatic brake valve is manipulated to apply the brakes by effecting a reduction in pressure in the main brake pipe.

The principal object of my invention is to provide means for overcoming the above difficulty.

In the accompanying drawing; Figure 1 is a sectional diagrammatic view of a locomotive brake equipment embodying my invention, and Fig. 2 a sectional view of the independent brake valve in handle off position.

According to the drawing, there may be provided an automatic brake valve 1 connected to the main brake pipe 2 and an independent brake valve 3 for controlling the pressure in an independent brake pipe 4 which may be connected to a triple valve device 5 or other valve device for controlling the brakes on the locomotive.

The triple valve device 5 may comprise a casing having a piston chamber 6 connected to the independent brake pipe 4 and containing piston 7 and having a valve chamber 8 connected to auxiliary reservoir 9 and containing a main slide valve 10 and a graduating slide valve 11 for controlling the admission and release of fluid under pressure to and from the brake cylinder 12.

According to my invention, a pipe connection 13 is provided between the independent brake pipe 4 and the main brake pipe 2 and interposed in said pipe connection is a valve device 14 comprising a casing containing a valve piston 15, subject on one side to pressure in the main brake pipe 2 and the pressure of a spring 16 and on the opposite side to the pressure in the independent brake pipe 4.

In operation, if the independent brake valve handle 17 is left in its usual running position, as intended, the independent brake pipe 4 will be connected to the main brake pipe through passage 18, cavity 19 in the rotary valve 20 and passage 21, so that if the automatic brake valve handle 22 be operated to effect a reduction in pressure in the main brake pipe 2, the pressure in the independent brake pipe 4 will also be reduced and the triple valve device 14 will be operated to effect an application of the brakes on the locomotive.

If the independent brake valve should be placed in handle off position, as shown in Fig. 2 of the drawing, the connection between the main brake pipe 2 and the independent brake pipe 4 will be cut off, but the independent brake pipe will be maintained charged through a port 23 in the rotary valve 20.

If the pressure in the main brake pipe 2 should be reduced to a predetermined degree under the above conditions, the higher independent brake pipe pressure acting below the valve piston 15 will lift the valve piston against the reduced pressure in the main brake pipe and thus connect the independent brake pipe with the main brake pipe, so that the pressure in the independent brake pipe will be reduced with the pressure in the main brake pipe and thus the triple valve on the locomotive will be operated to effect an application of the brakes, although the independent brake valve is in a position closing the usual connection between the main brake pipe and the independent brake pipe.

Having now described my invention, what I claim as new and desire to secure by Letters Patent, is:—

1. In a fluid pressure brake, the combination with a main brake pipe, an independent brake pipe, and a brake valve normally connecting the main brake pipe with the independent brake pipe, of means operated upon a reduction in pressure in the main brake pipe for also connecting the independent brake pipe to the main brake pipe.

2. In a fluid pressure brake, the combination with a main brake pipe, a main brake valve for effecting a reduction in pressure in the main brake pipe, an independent brake pipe, and an independent brake valve for varying the pressure in the independent brake pipe, of means operating upon a predetermined reduction in pressure in the main brake pipe for connecting the independent brake pipe to the main brake pipe.

3. In a fluid pressure brake, the combination with a main brake pipe, a main brake valve for reducing the pressure in the main brake pipe to effect an application of the brakes on the train, an independent brake pipe, and an independent brake valve for reducing the pressure in the independent brake pipe to effect an application of the brakes on the locomotive, of means operating upon a predetermined reduction in pressure in the main brake pipe for establishing communication between the main brake pipe and the independent brake pipe.

4. In a fluid pressure brake, the combination with a main brake pipe, an independent brake pipe, and a brake valve for controlling communication from the independent brake pipe to the main brake pipe and having a handle off position in which said communication is closed, of means operating upon a reduction in pressure in the main brake pipe for opening communication from the independent brake pipe to the main brake pipe and means for charging the independent brake pipe with fluid under pressure when the independent brake valve is in the handle off position.

In testimony whereof I have hereunto set my hand.

WALTER V. TURNER.